W. D. SUMMERS.
Harrows.

No. 142,055. Patented August 19, 1873.

Attest:
Jas. H. Layman
Walter Allen

W. D. Summers
By Knight Bros.
Att'ys.

UNITED STATES PATENT OFFICE.

WILLIAM D. SUMMERS, OF HOPKINSVILLE, KENTUCKY.

IMPROVEMENT IN HARROWS.

Specification forming part of Letters Patent No. 142,055, dated August 19, 1873; application filed July 5, 1873.

*To all whom it may concern:*

Be it known that I, WILLIAM D. SUMMERS, of Hopkinsville, Christian county, Kentucky, have invented certain new and useful Improvements in Harrows, of which the following is a specification:

My invention consists in an arrangement of parts whereby a large triangular-shaped harrow can be converted to two small triangular ones, or the latter again combined to constitute a single large one, the parts being arranged in such a manner as to enable these changes to be effected in a few minutes, as hereinafter more fully described.

Figure 1:
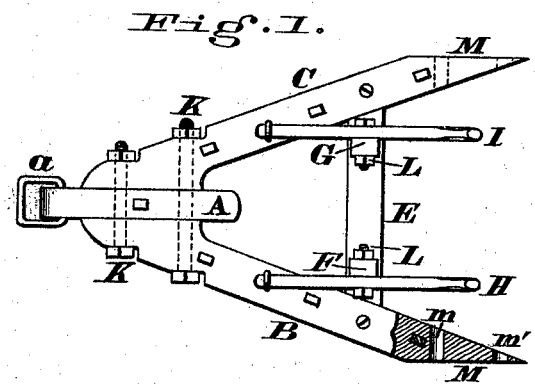
Figure 3:
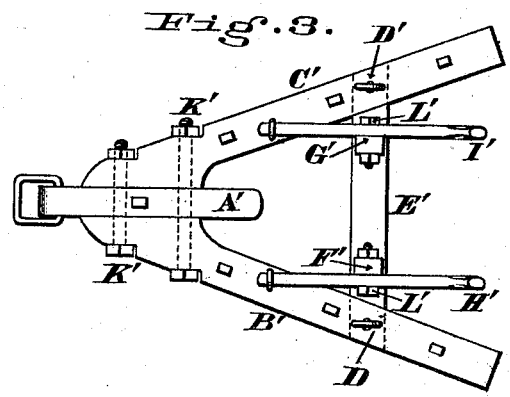
Figure 2:
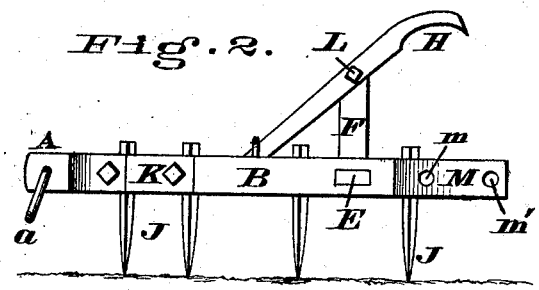
Figure 4:
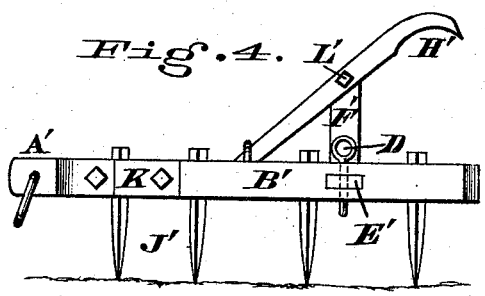
Figure 5:
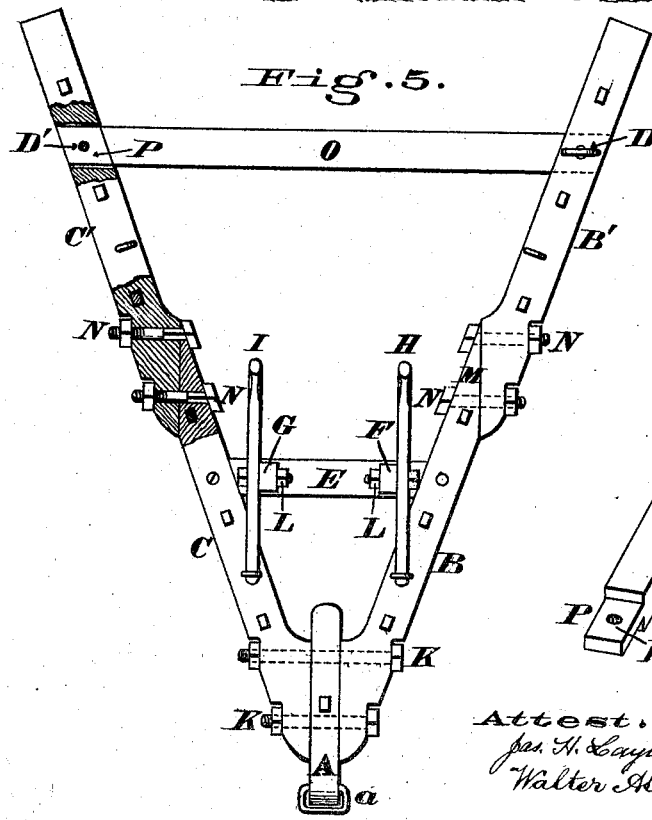
Figure 6:
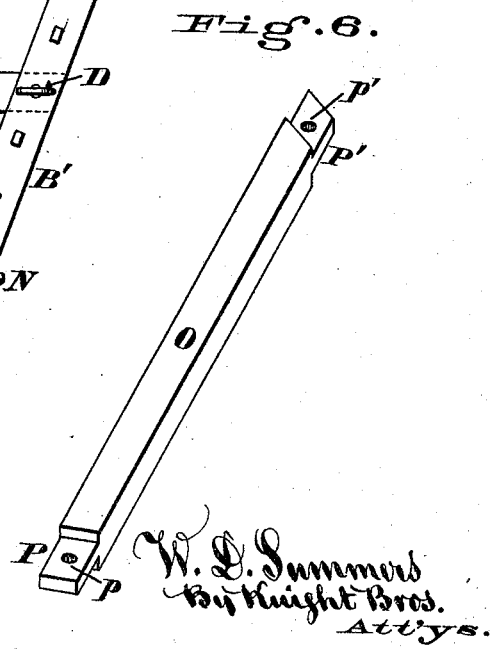

Figure 1 is a plan of an ordinary triangular-shaped harrow embodying my improvements, a portion of one of the side beams being shown in section. Fig. 2 is a side elevation of the same. Fig. 3 is a plan of a harrow which is capable of being disjointed and of having its side beams connected to the implement shown in the preceding views. Fig. 4 is a plan of said detachable harrow. Fig. 5 is a plan showing the method of arranging the various members of the two small harrows so as to constitute a single large one, and Fig. 6 is a perspective view of the brace that is employed for uniting the side beams of the large harrow.

The implement represented in Figs. 1 and 2 consists, essentially, of a central beam, A, two rearwardly-diverging side beams, B C, a brace, E, two standards, F G, and two handles, H I, all of which are arranged in the same manner as in ordinary triangular-shaped harrows. The implement is provided with a customary clevis, a, and teeth J. K are bolts which connect the side beams B C to the central one, A. L are bolts wherewith the handles H I are secured to the standards F G.

The only material difference in construction between the above-described harrow and an ordinary one consists in chamfering off the outer sides of the beams B C, as shown at M, and providing said chamfered portions with transverse apertures $m$ $m'$, for a purpose which will presently appear.

The harrow shown in Figs. 3 and 4 is essentially the same as the one just described, being composed of a main beam, A', side beams B' C', brace E', standards F' G', handles H' I', and teeth J'. In this implement, however, the brace E', instead of being permanently secured to the side beams, as shown in Fig. 1, is only coupled to the beams B' C' by ring-eyes D D', or other devices that can be readily withdrawn when it is desired to disconnect the harrow.

K' and L' are bolts which perform the same functions as their corresponding members, shown in Figs. 1 and 2.

Either or both of the above-described harrows can be used for all ordinary agricultural operations; but when it is desired to go over the ground for the first time after plowing, the two implements should be united so as to constitute a single large one, thereby economizing time and labor.

The manner of converting the two small harrows into a single large one is as follows: The nuts are unscrewed from the bolts K' L', and said bolts, together with the ring-eyes D D', withdrawn, after which the handles H' I' are unshipped from the implement, and the side beams B' C' detached from the main beam A'. The detached side beams B' C' are now united to the chamfered portions M of the beams B C of the other implement by bolts N, which pass through the apertures $m$ $m'$, and also through holes in said beams B' C', which previously retained the bolts K'. Before tightening up these bolts N, the brace O is applied to the side beams B' C', as shown in Fig. 5, said brace having tenons P P' at its ends. These tenons are perforated at $p$ $p'$ to receive the ring-eyes D D'. As soon as the nuts upon the bolts N are screwed home, the act of forming the large harrow is completed, and it is at once ready for use.

By referring to Fig. 5 it will be seen that the handles B C of the implement shown in Figs. 1 and 2 serve as the handles for the enlarged harrow. The team is attached to the clevis a.

After the ground has been harrowed with the enlarged implement, it can be reconverted into two smaller ones by simply reversing the previously-described operation, and said smaller harrows will be useful in cultivating various crops, such as maize, &c.

This combination of the two small harrows, so as to constitute a single large one, will enable farmers to avail themselves of the advantages due to both forms of the implement without being obliged to incur the expense of two sizes.

I claim as my invention—

The within-described convertible implement, consisting of a permanent triangular harrow, and a separable one of similar shape, whose side beams may be rigidly coupled to the side beams of the permanent one, and maintained in their proper position by the removable brace O, the handles of the permanent harrow serving for the enlarged triangular-shaped harrow thus formed, substantially as shown and described.

In testimony of which invention I hereunto set my hand.

WILLIAM D. SUMMERS.

Attest:
  H. R. LITTELL,
  JAMES O. ELLIS.